United States Patent
Thyni et al.

(10) Patent No.: US 9,191,281 B2
(45) Date of Patent: Nov. 17, 2015

(54) SYSTEMS AND METHODS FOR CONFIGURING A DEMARCATION DEVICE

(75) Inventors: Tomas Thyni, Jarfalla (SE); Mats Forsman, Ronninge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 440 days.

(21) Appl. No.: 13/127,092

(22) PCT Filed: Nov. 5, 2008

(86) PCT No.: PCT/IB2008/002974
§ 371 (c)(1),
(2), (4) Date: May 2, 2011

(87) PCT Pub. No.: WO2010/052515
PCT Pub. Date: May 14, 2010

(65) Prior Publication Data
US 2011/0211493 A1    Sep. 1, 2011

(51) Int. Cl.
*H04L 12/24* (2006.01)

(52) U.S. Cl.
CPC ............ *H04L 41/12* (2013.01); *H04L 41/0843* (2013.01); *H04L 41/0213* (2013.01); *H04L 41/0856* (2013.01)

(58) Field of Classification Search
None
See application file for complete search history.

(56) References Cited

U.S. PATENT DOCUMENTS

| | | | |
|---|---|---|---|
| 6,188,691 B1 * | 2/2001 | Barkai et al. | 370/390 |
| 6,785,272 B1 * | 8/2004 | Sugihara | 370/386 |
| 6,934,292 B1 * | 8/2005 | Ammitzboell | 370/400 |
| 7,660,330 B1 * | 2/2010 | Shmilovici | 370/503 |
| 7,869,432 B1 * | 1/2011 | Mollyn | 370/389 |
| 8,040,901 B1 * | 10/2011 | Kompella et al. | 370/395.71 |
| 2004/0151168 A1 * | 8/2004 | Phillips et al. | 370/359 |
| 2004/0184464 A1 * | 9/2004 | Holden | 370/395.51 |
| 2005/0182832 A1 * | 8/2005 | Chen | 709/223 |
| 2006/0133368 A1 * | 6/2006 | Tolliver | 370/389 |
| 2006/0239183 A1 * | 10/2006 | Robitaille et al. | 370/217 |
| 2007/0110077 A1 * | 5/2007 | Takashige et al. | 370/395.53 |
| 2007/0168563 A1 * | 7/2007 | Jha et al. | 709/250 |
| 2008/0186967 A1 * | 8/2008 | Li et al. | 370/390 |
| 2008/0275975 A1 * | 11/2008 | Pandey et al. | 709/223 |
| 2009/0172704 A1 * | 7/2009 | Ingle et al. | 719/321 |
| 2010/0202441 A1 * | 8/2010 | Haag et al. | 370/352 |
| 2010/0309817 A1 * | 12/2010 | Johnsson et al. | 370/254 |
| 2012/0155877 A1 * | 6/2012 | Effenberger et al. | 398/66 |
| 2012/0218994 A1 * | 8/2012 | Zheng | 370/389 |
| 2013/0336146 A1 * | 12/2013 | Mohan | 370/252 |

FOREIGN PATENT DOCUMENTS

EP    1585298 A1    10/2005

* cited by examiner

*Primary Examiner* — Timothy J Weidner

(74) *Attorney, Agent, or Firm* — Rothwell, Figg, Ernst & Manbeck, P.C.

(57) ABSTRACT

The present application discloses, among other things, an improved demarcation device. In some embodiments, the demarcation device includes: a physical layer module for receiving frames transmitted to the device; and a device configuration protocol layer configured to: (a) receive the frame after the frame is received from the physical layer, (b) determine whether the frame is a valid device configuration protocol data unit (DCPDU), and (c) execute a command if the frame is a valid DCPDU.

15 Claims, 5 Drawing Sheets

SYSTEMS AND METHODS FOR CONFIGURING A DEMARCATION DEVICE

CROSS-REFERENCE TO RELATED APPLICATION

This application is a 35 U.S.C. §371 National Phase Entry Application from PCT/IB2008/002974, filed Nov. 5, 2008, and designating the United States.

TECHNICAL FIELD

The present invention relates to the management of network devices (e.g., demarcation devices).

BACKGROUND

Typically, open access Ethernet networks are built using either complex, yet manageable Ethernet demarcation devices (EDDs) (e.g., residential gateways (RGs) or other gateways or routers or bridges) or simple EDDs (e.g, optical-electrical converters or other converters) that can not be managed remotely. The open access network provider has to make a choice between a costly and manageable solution or a cheap and non-manageable solution.

The technology that exists today for configuring open access Ethernet demarcation devices primarily uses the simple network management protocol (SNMP) or sometimes other protocols running over the Internet Protocol (IP). A problem with this technology is that it typically requires use of an IP address. Also, the SNMP protocol requires more than an insignificant amount of processing power. There is a standard to implement SNMP directly over Ethernet to avoid the need for an IP address on the managed device (see RFC4789), but this requires management of individual MAC addresses instead. The Ethernet first mile (EFM) operations, administration and maintenance (OAM) protocol can be used to monitor an EDD and do fault isolation, but does not allow for configuration of the EDD.

Document EP 1585268 (D1) is directed to a system and method for monitoring, controlling and provisioning a telecommunications access network. The network includes a first access device (i.e., access device 220) and a second access device (i.e., demarcation device 220). D1 describes that access device 220 may "receive provisioning information from [a] control system via the in-band communications flow, and distribute provisioning commands to the appropriate demarcation device." Paragraph 0063. Accordingly, D1 discloses an access device that transmits commands to a demarcation device. D1, however, does not describe how the access device 220 transmits the configuration commands to the demarcation device. Document US 2004/151168 (D2) discloses network interface devices and systems and methods for using them, where the network interface devices are adapted to receive a plurality of sets of telecommunication information and distribute at least one of the plurality to a customer premises.

What is desired are system and methods for overcoming at least some of the above described disadvantages.

SUMMARY

In one aspect, the invention provides a network management method performed by a first network access device (e.g., an Ethernet switch, router, gateway or other access device). In some embodiments, the method includes the step of causing a second network access device (e.g., a demarcation device) to configure itself (e.g., reconfigure a port of the demarcation device), wherein the second network device is connected to the first network access device by a point-to-point connection and the causing step comprises: creating a data link layer protocol data unit; and transmitting, from the first network device to the second network device, the data link layer protocol data unit, characterized in that: (a) the data link layer protocol data unit includes information identifying a configuration setting, and (b) the data link layer protocol data unit is configured to cause the second network device to execute one or more configuration instructions to achieve the identified configuration setting.

In some embodiments, the step of causing the second network access device to configure itself comprises causing the second network access device to configure a port of the device.

In some embodiments, the data link layer protocol data unit is a link local message (i.e., the protocol data unit is configured in such a way that the second network device will not re-transmit the protocol data unit to another other communication device).

In some embodiments, the second network access device is an Ethernet demarcation device and the data link layer protocol data unit is an Ethernet protocol data unit (EPDU) (i.e., an Ethernet frame) having a media access control (MAC) destination address field, a type field, and a sub-type field. In some embodiments, the value of the MAC destination address field is set to a link local MAC address (e.g. the slow protocol MAC address (e.g., 01-80-C2-00-00-02)) and the value of the type field is set to a value indicating that the EPDU is a slow protocol frame (e.g., the type field is set to 0x8809). In some embodiments, the sub-type field is set to a value other than a value associated with the operation, administration and maintenance (OAM) protocol (e.g., a value other than 0x03), while in other embodiments the sub-type field is set to 0x03 (e.g., in the case where the Ethernet OAM protocol is extended to be used for configuration as well). In other embodiments, the value of the type field is set to a value indicating that the EPDU is a device configuration protocol data unit (DCPDU).

In another aspect, the present invention provides network access device. In some embodiments, the network access device includes: (1) a computer readable medium; (2) computer software, stored on the computer readable medium, that when executed enables the network access device to use a point-to-point connection to cause a second network access device that is connected to the point-to-point connection to configure itself, said computer software comprising computer instructions configured to create a data link layer protocol data unit (DLLPDU) that (a) includes information corresponding to a configuration command, and (b) is configured to cause the second network device to execute the configuration command; and (3) a transmitter capable of transmitting to the second network device the data link layer protocol data unit.

In another aspect, the present invention provides a demarcation device. In some embodiments, the demarcation device includes: a physical layer module for receiving frames transmitted to the device; and a device configuration protocol layer configured to: (a) receive the frame after the frame is received from the physical layer, (b) determine whether the frame is a valid device configuration protocol data unit (DCPDU), and (c) execute a command if the frame is a valid DCPDU.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
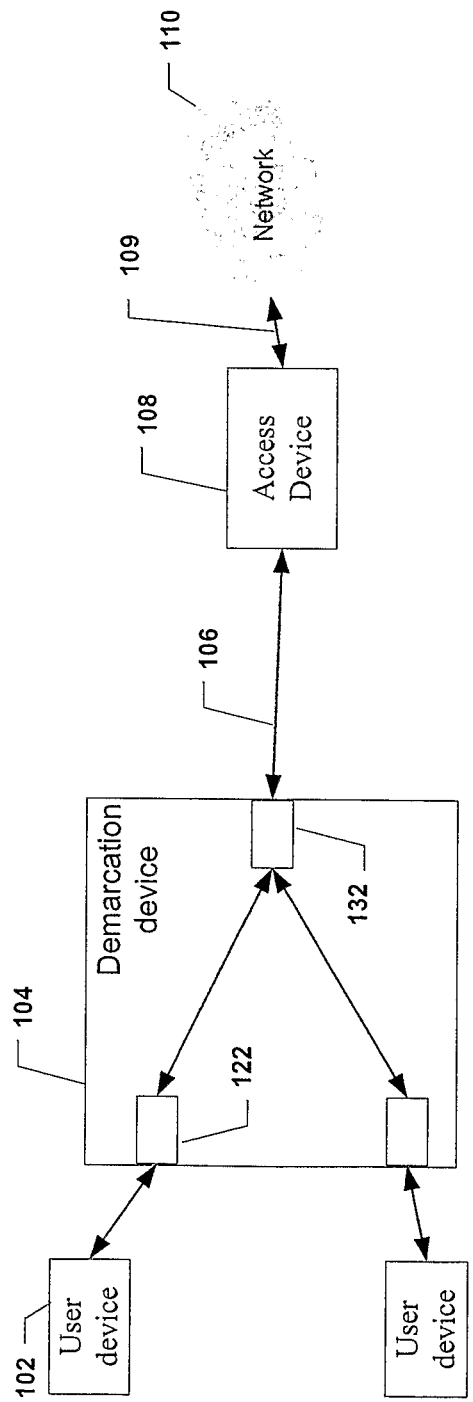
FIG. 1 illustrates a first communication device in communication with a second communication device.

Referring now to FIG. 1, FIG. 1 illustrates a portion of a communications network. As illustrated, network includes a demarcation device 104 (e.g., an EDD or other demarcation device) connected via a link 106 (e.g., a 1000Base-X link or a 1000Base-T link or other link) to an access device 108 (e.g., an Ethernet switch, router or gateway or other network device), which is connected to a network 110 via a connection 109. Demarcation device 104 may include a port 122 to which user device 102 connects and an interface 132 for connecting device 104 to link 106. Advantageously, access device 108 and demarcation device 104 are configured such that access device 108 can send configuration commands to demarcation device 104 without having to use SNMP or other similar protocol.

Figure 2:
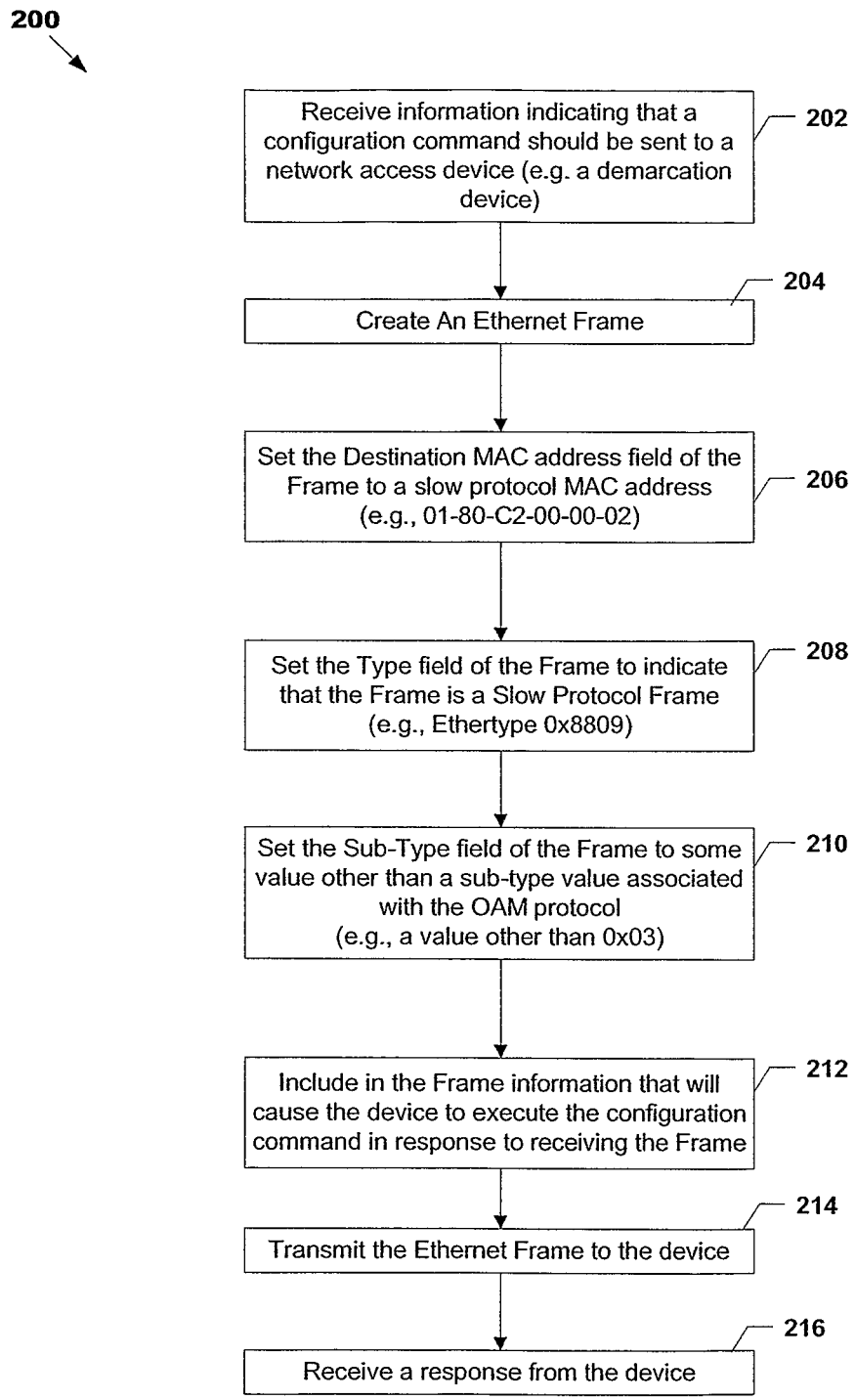
FIG. 2 is a flow chart illustrating a process, according to some embodiments of the invention, that is performed by an access device when the access device is used to configure a demarcation device to which the access device is connected.

Referring now to FIG. 2, FIG. 2 is a flow chart illustrating a process 200, according to some embodiments of the invention, that is performed by access device 108 when access device 108 is used to configure demarcation device 104. Process 200 may begin in step 202, where the access device receives information indicating that a configuration command should be sent to demarcation device 104. For example, in step 202, access device 108 may receive from an operation and maintenance (O&M) system an SNMP message that includes information indicating that access device 108 should send a configuration command to demarcation device 104. Alternatively, in step 202 a user of access device 108 may input the information directly into access device 108 using, for example, a user interface provided by access device 108.

In step 204, in response to receiving the information, access device 108 creates a frame (e.g., an Ethernet frame—a.k.a., Ethernet Protocol Data Unit (EPDU)). In step 206, access device 108 sets the destination MAC address field of the frame to a link local MAC address (e.g., 01-80-C2-00-00-02). In step 208, access device 108 sets the Type field of the frame to indicate that the frame is a Slow Protocol Frame (e.g., Ethertype 0x8809). In step 210, access device 108 sets the Sub-Type field of the frame to some value other than a sub-type value associated with the OAM protocol (e.g., a value other than 0x03). However, in other embodiments, in step 210, access device 108 sets the Sub-Type field to 0x03, but may set a Code field of the frame to some value to indicate that the message is a configuration message. In step 212, access device 108 includes in the frame information that will cause demarcation device 104 to execute a configuration command in response to receiving the frame. In step 214, access device 108 transmits the Ethernet frame to demarcation device 104. Demarcation device 104 may transmit a message to access device 108 in response. In step 216, access device 108 receives the response transmitted from demarcation device 104. An Ethernet frame constructed as described above is referred to herein as a "device configuration protocol data unit" (DCPDU).

Figure 3:
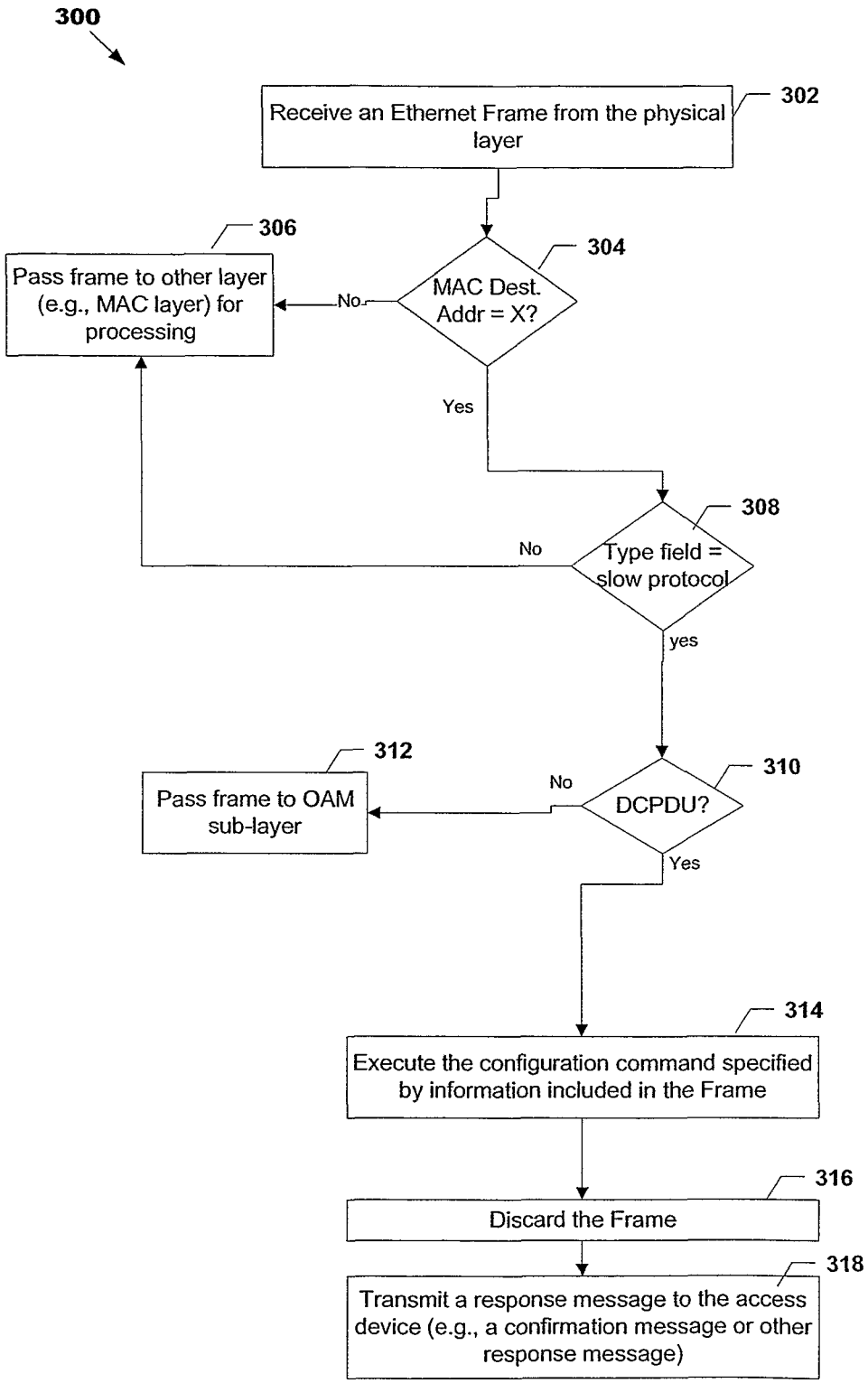
FIG. 3 is a flow chart illustrating a process, according to some embodiments of the invention, that is performed by a demarcation device.

Referring now to FIG. 3, FIG. 3 is a flow chart illustrating a process 300, according to some embodiments of the invention, that is performed by demarcation device 104. Process 300 may begin in step 302, where device 104 receives an Ethernet frame. In step 304, device 104 determines whether the destination MAC address field of the frame equals a predetermined value (X) (e.g., device 104 determines whether the destination MAC address field of the frame equals a slow protocol MAC address (e.g., 01-80-C2-00-00-02)). If the destination MAC address field of the frame does not equal X, then process 300 proceeds to step 306, otherwise process 300 proceeds to step 308. In step 306, the frame may be passed to another protocol layer (e.g., a MAC layer 410— see FIG. 4). In step 308, device 104 determines whether the Type field of the frame indicates that the frame is a Slow Protocol Frame. For example, in step 308, device 104 may determine whether the Type field is set to a value of 0x8809. If the type field of the frame does indicate that the frame is a Slow Protocol Frame, then process 300 proceeds to step 306, otherwise process 300 proceeds to step 310.

In step 310, device 104 determines whether the frame is a DCPDU. For example, in some embodiments, this determination is based on the value of the Sub-Type field of the frame. While in other embodiments, this determination is based on the value of the Sub-Type field and the value of a code field. As a specific example, in step 310, device 104 treats the frame as a DCPDU if the sub-type field is set to 0x03 and a certain code field is set to a particular value. If, in step 310, device 104 determines that the frame is not a DCPDU, then process 300 may proceed to step 312, otherwise it proceeds to step 314. In step 312, the frame may be passed to an OAM module 408 for OAM processing. In step 314, device 104 executes a configuration command specified by information included in the DCPDU (assuming the frame is configured to cause device 104 to execute a configuration command—i.e., assuming the frame is a valid DCPDU). In step 316, the frame is discarded. In step 318, device 104 may transmits a response message to the device that transmitted the Ethernet frame. For example, device 104 may transmit a confirmation message acknowledging that the frame was received. Additionally, if the command executed by device 104 is a "read" type command, then the response message may include the data that was required by the read command.

The configuration command can be of the following types (but not limited to) depending on the device/chipset capability: (1) a read command and (2) a set configuration command. A read command may cause the device to read a capability or configuration setting. A set configuration command may cause the device to: (a) map a port to a VLAN, (b) perform a port/VLAN stacking command, (c) perform a VLAN class of service (CoS) command, (d) perform a port/VLAN queuing command, or (d) perform a Port/VLAN IGMP/MLD snooping command.

As is evident from the above, embodiments of the invention provide a lightweight way of configuring and controlling an EDD from the access device to which the demarcation device is connected without the need for an IP and/or SNMP stack in the EDD. For example, an access device can configure an EDD by merely transmitting a valid DCPDU to the EDD.

Figure 4:
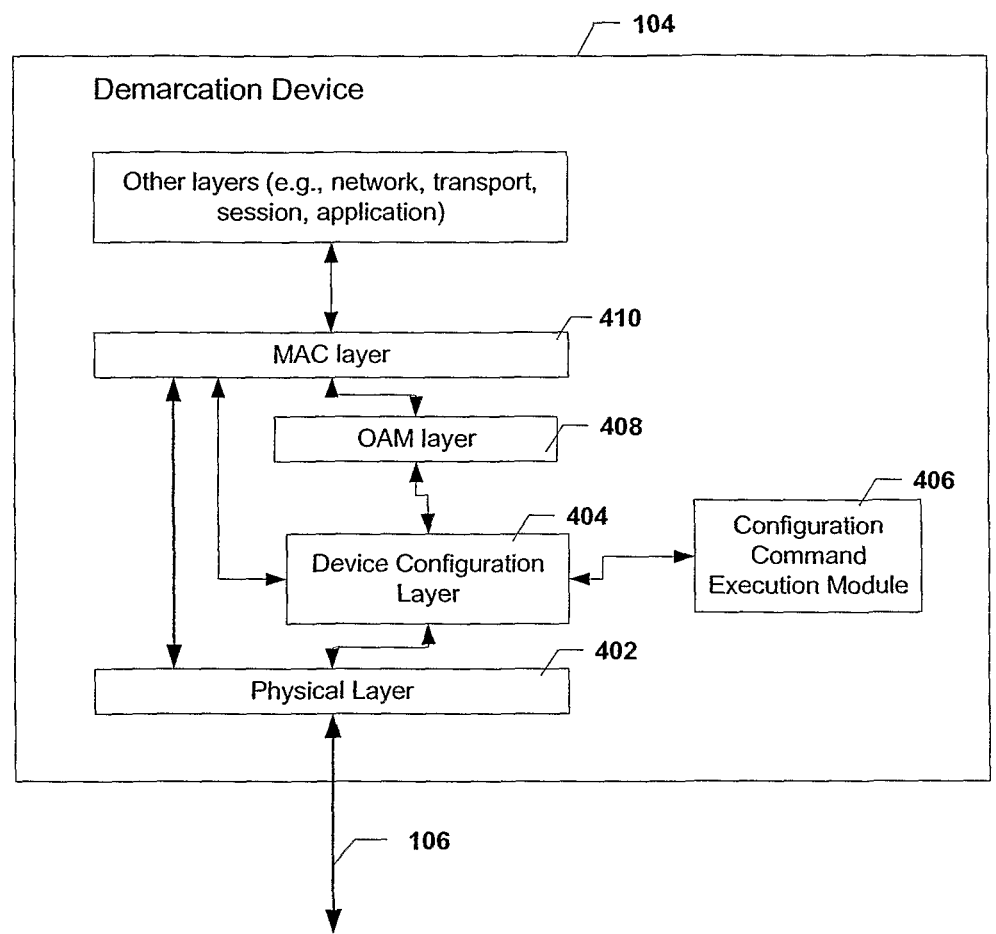
FIG. 4 is a functional block diagram of a portion of a demarcation device according to embodiments of the invention.

Referring to FIG. 4, FIG. 4 is a functional block diagram of a demarcation device 104 according to some embodiments. As shown in FIG. 4, device 104 may include a number of modules (software and/or hardware). For example, device 104 may include a physical layer module 402 that is configured to transmit data units (e.g., Ethernet frames) onto link 106 and receive frames from link 106. In some embodiments, when physical layer 402 receives a frame from link 106, layer 402 passes the frame to a device configuration layer module 404. Module 404, in some embodiments, is configured to perform process 300. That is, module 404 may determine whether the frame is a valid DCPDU. If the frame is a valid DCPDU, then module 404 will execute a command by providing the frame (or data that was included in the frame) to Configuration Command Execution Module (CCEM) 406. CCEM 406 takes an action based on the data provided to it from device configuration module 404. If the frame is not a DCPDU, then module 404 may pass the frame to another module (e.g., MAC layer 410 or OAM module 408).

Figure 5:
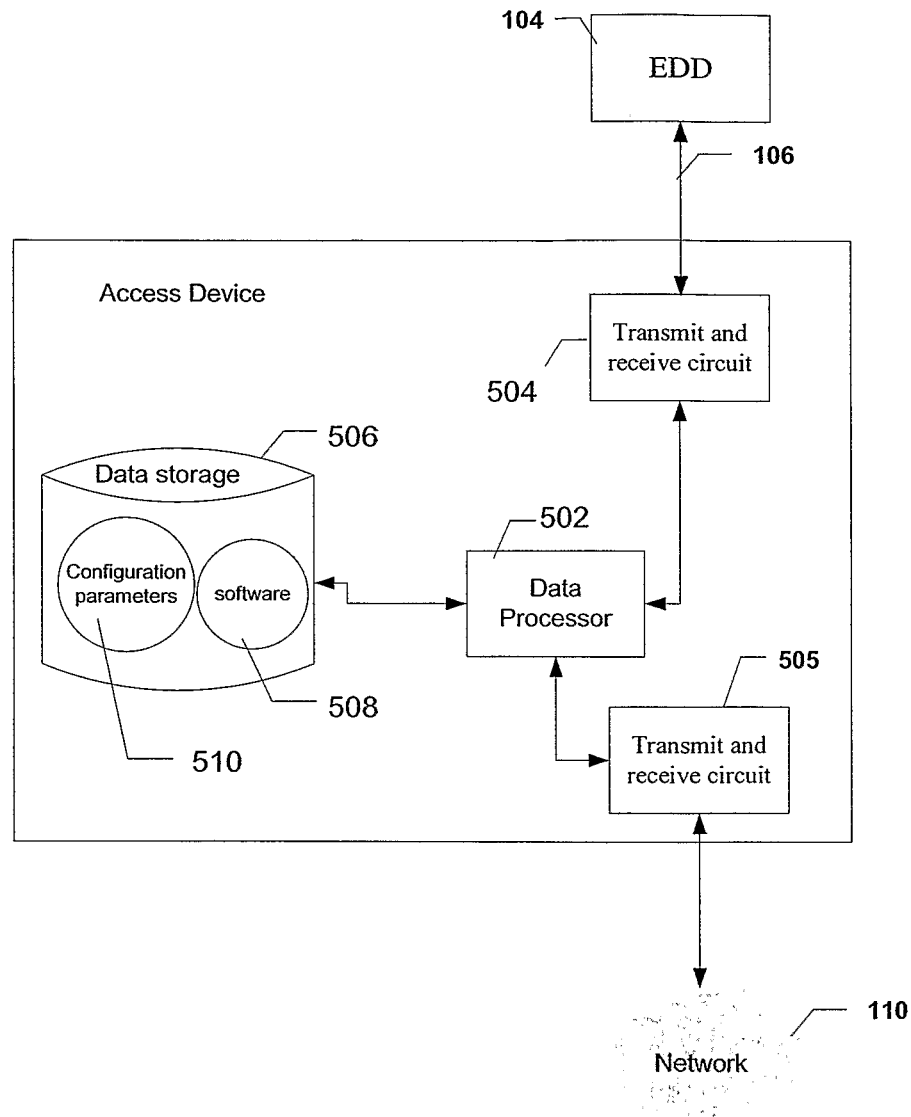
FIG. 5 is a functional block diagram of a portion of an access device according to embodiments of the invention.

Referring to FIG. 5, FIG. 5 is a functional block diagram of an access device 108 according to some embodiments. As shown, access device 108 may comprise a data processing system 502 (e.g., one or more mircoprocessors), a data storage system 506 (e.g., one or more non-volatile storage devices) and computer software 508 stored by the storage system 506. Configuration parameters 510 may also be stored in storage system 506. Access device 108 also may comprise transmit/receive (Tx/Rx) circuitry 504 for transmitting data to and receiving data from EDD 104 and transmit/receive (Tx/Rx) circuitry 505 for transmitting data to and receiving data from network 110. Software 508 is configured such that when processor 502 executes software 508, access device 108 performs steps described above with reference to the flow chart shown in FIG. 2. For example, software 508 may include: computer instructions configured to create a data link layer protocol data unit (DLLPDU) (e.g., a DCPDU) that (a) includes information corresponding to a configuration command, and (b) is configured to cause the second network device to execute the configuration command. That is, software 508 may be configured to perform steps 204-212 of process 200.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A network management method performed by a first network access device, comprising:
   the first network device causing a second network access device to configure itself, wherein the second network device is directly connected to the first network access device by only a point-to-point connection and the causing step comprises:
   creating a data link layer protocol data unit (DLLPDU); and
   transmitting, from the first network device to the second network device, the data link layer protocol data unit, wherein:
   (a) the data link layer protocol data unit includes information identifying a configuration setting, and
   (b) the data link layer protocol data unit is configured to cause the second network device to execute one or more configuration instructions to achieve the identified configuration setting, wherein
   the data link layer protocol data unit is a local-link message,
   the step of causing the second network access device to configure itself comprises causing the second network access device to execute one or more of: i) a VLAN queuing command, and ii) a VLAN snooping command,
   the data link layer protocol data unit is an Ethernet protocol data unit (EPDU) having a media access control (MAC) destination address field, a type field, and a sub-type field,
   the MAC destination address field is set to a link local MAC address,
   the type field is set to a value indicating that the EPDU is a slow protocol frame,
   the sub-type field is set to a first predetermined value,
   a code field within the EPDU is set to a second predetermined value, and
   the combination of the value of the sub-type field and the value of the code field indicates that the local-link message is a configuration message.

2. The method of claim 1, wherein the second network access device is a demarcation device.

3. The method of claim 2, wherein the demarcation device is an Ethernet demarcation device.

4. The method of claim 1, wherein the sub-type field is set to a value of 0x03.

5. The method of claim 1, wherein the step of causing the second network access device to configure itself comprises causing the second network access device to configure a port of the device.

6. The method of claim 5, wherein causing the second network access device to configure a port of the device comprises causing the second network access device to map the port to a virtual local area network (VLAN).

7. The method of claim 1, wherein the step of causing the second network access device to configure itself comprises causing the second network access device to execute one or more of a VLAN stacking command and a VLAN snooping command.

8. The method of claim 1, wherein the step of causing the second network access device to configure itself comprises causing the second network access device to execute one or more of a VLAN stacking command and a VLAN queuing command.

9. The method of claim 1, further comprising receiving a message that includes information indicating that the first network access device should send a configuration command to the second network access device, wherein the step of causing the second network access device to configure itself is performed in response to said message, wherein said message is a Simple Network Management Protocol (SNMP) message.

10. A network access device, comprising:
    a computer readable medium;
    computer software, stored on the computer readable medium, that when executed enables the network access device to use a point-to-point connection to cause a second network access device to configure itself, wherein the second network access device is directly connected to the network access device via the point-to-point connection, said computer software comprising computer instructions configured to create a data link layer protocol data unit (DLLPDU) that (a) includes information corresponding to a configuration command, and (b) is configured to cause the second network device to execute the configuration command; and a transmitter capable of transmitting to the second network device the DLLPDU, wherein the configuration command is a command for causing the second network access device to execute one or more of: i) a VLAN queuing command, and ii) a VLAN snooping command, the data link layer protocol data unit is an Ethernet protocol data unit (EPDU) having a media access control (MAC) destination address field, a type field, and a sub-type field, the computer instructions configured to create the DLLPDU are configured to:

set the MAC destination address field to a link local MAC address, set the type field to a value indicating that the EPDU is a slow protocol frame, set the sub-type field to a first predetermined value, set a code field within the EPDU to a second predetermined value, and the combination of the value of the sub-type field and the value of the code field indicates that the DLLPDU message is a configuration message.

11. The network access device of claim 10, wherein the second network access device is a demarcation device.

12. The network access device of claim 11, wherein the demarcation device is an Ethernet demarcation device.

13. The network access device of claim 10, wherein the computer instructions configured to create the DLLPDU are configured to set the type field to a value of 0x8809.

14. The network access device of claim 10, wherein the first predetermined value is 0x03.

15. The network access device of claim 10, wherein the configuration command is a command for causing the second network access device to execute one or more of a VLAN stacking command and a VLAN snooping command.

* * * * *